US006644573B2

United States Patent
Irwin

(10) Patent No.: US 6,644,573 B2
(45) Date of Patent: Nov. 11, 2003

(54) COMMINUTING APPARATUS AND PNEUMATIC RECIRCULATION SYSTEMS FOR COMMINUTING APPARATUS

(76) Inventor: Jere F. Irwin, P.O. Box 10668, Yakima, WA (US) 98909-1668

( * ) Notice: Subject to any disclaimer, the term of this patent is extended or adjusted under 35 U.S.C. 154(b) by 0 days.

(21) Appl. No.: 09/885,212

(22) Filed: Jun. 18, 2001

(65) Prior Publication Data

US 2002/0190146 A1 Dec. 19, 2002

(51) Int. Cl.[7] .............................................. B02C 18/22
(52) U.S. Cl. ....................................... 241/80; 241/236
(58) Field of Search .............................. 241/73, 80, 62, 241/236, 60, 61, 97

(56) References Cited

U.S. PATENT DOCUMENTS

| 745,176 | A | 2/1903 | Grinsted | |
|---|---|---|---|---|
| 2,595,117 | A | 4/1952 | Ahlmann | |
| 3,055,597 | A | 9/1962 | Mund | |
| 3,229,698 | A | 1/1966 | Johansson et al. | |
| 3,310,059 | A | 3/1967 | Grinzinger | |
| 3,627,211 | A | 12/1971 | Leach | 241/3 |
| 3,724,766 | A | 4/1973 | Bosland | 241/100 |
| 4,134,556 | A | 1/1979 | Ehrlich et al. | 241/79.3 |
| 4,161,296 | A | 7/1979 | Parker et al. | 241/152 A |
| 4,321,027 | A | 3/1982 | Stoehr et al. | 425/216 |
| 4,355,766 | A | 10/1982 | Wigand | 241/222 |
| 4,422,581 | A | 12/1983 | Chryst | 241/66 |
| 4,687,144 | A | 8/1987 | Irwin et al. | 241/49 |
| 5,039,020 | A | 8/1991 | Leuthold et al. | 241/30 |
| 5,141,168 | A | 8/1992 | Pepper | 241/236 |
| 5,248,100 | A | 9/1993 | Arakawa | 241/34 |
| 5,427,321 | A | 6/1995 | Takahashi et al. | 241/73 |
| 5,609,307 | A | 3/1997 | Rota | 241/73 |
| 5,836,527 | A | 11/1998 | Irwin et al. | 241/49 |
| 5,860,607 | A | 1/1999 | Irwin | 241/80 |
| 5,893,523 | A | 4/1999 | Irwin | 241/60 |

FOREIGN PATENT DOCUMENTS

| DE | 3614-028 A1 | 10/1987 |
|---|---|---|
| SU | 1556-745 A | 4/1990 |
| WO | WO 95/33566 | 12/1995 |

*Primary Examiner*—Mark Rosenbaum
(74) *Attorney, Agent, or Firm*—Wells St. John P.S.

(57) ABSTRACT

A comminuting apparatus is provided which includes a frame, at least one drive motor, a set of overlapping scissor rolls and a recycle manifold. The frame has an enclosure with an entrance opening for receiving waste material. At least one drive motor is carried by the frame. The set of overlapping scissor rolls includes a first scissor roll and a second scissor roll carried within the enclosure for co-rotation and driven by the at least one drive motor, configured to draw material from beneath for delivery between the overlapping scissor rolls to subdivide the material. The recycle manifold is provided above and downstream of the scissor rolls and is configured to receive the subdivided material from between the overlapping scissor rolls. The pneumatic conveyor comprises a source of air and a pneumatic duct communicates with the recycle manifold, the pneumatic duct is configured to deliver an air stream from the source of air into the recycle manifold to entrain subdivided pieces and move the subdivided pieces from the recycle manifold for further conveying and subdividing within the comminuting apparatus.

23 Claims, 12 Drawing Sheets

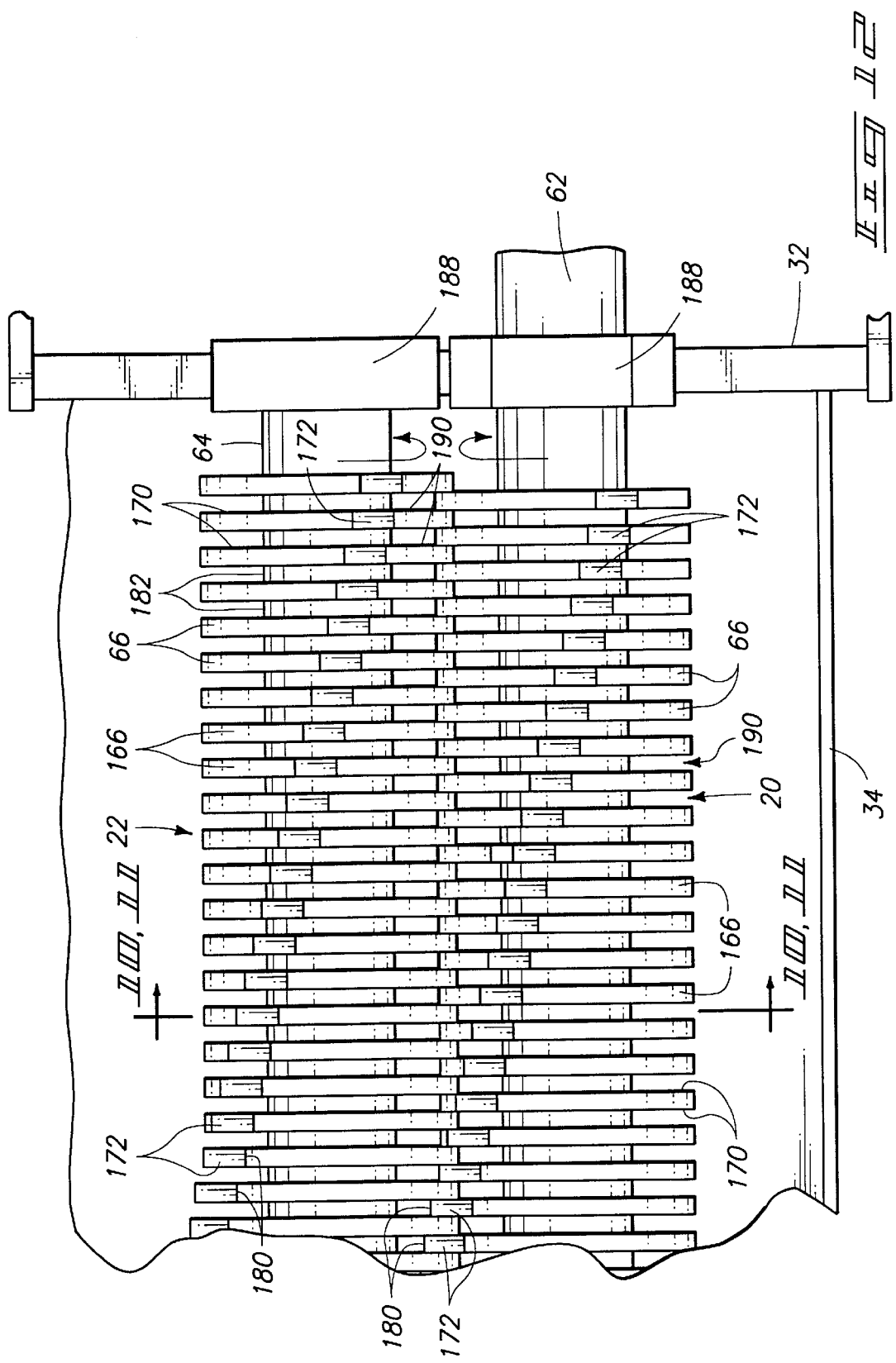

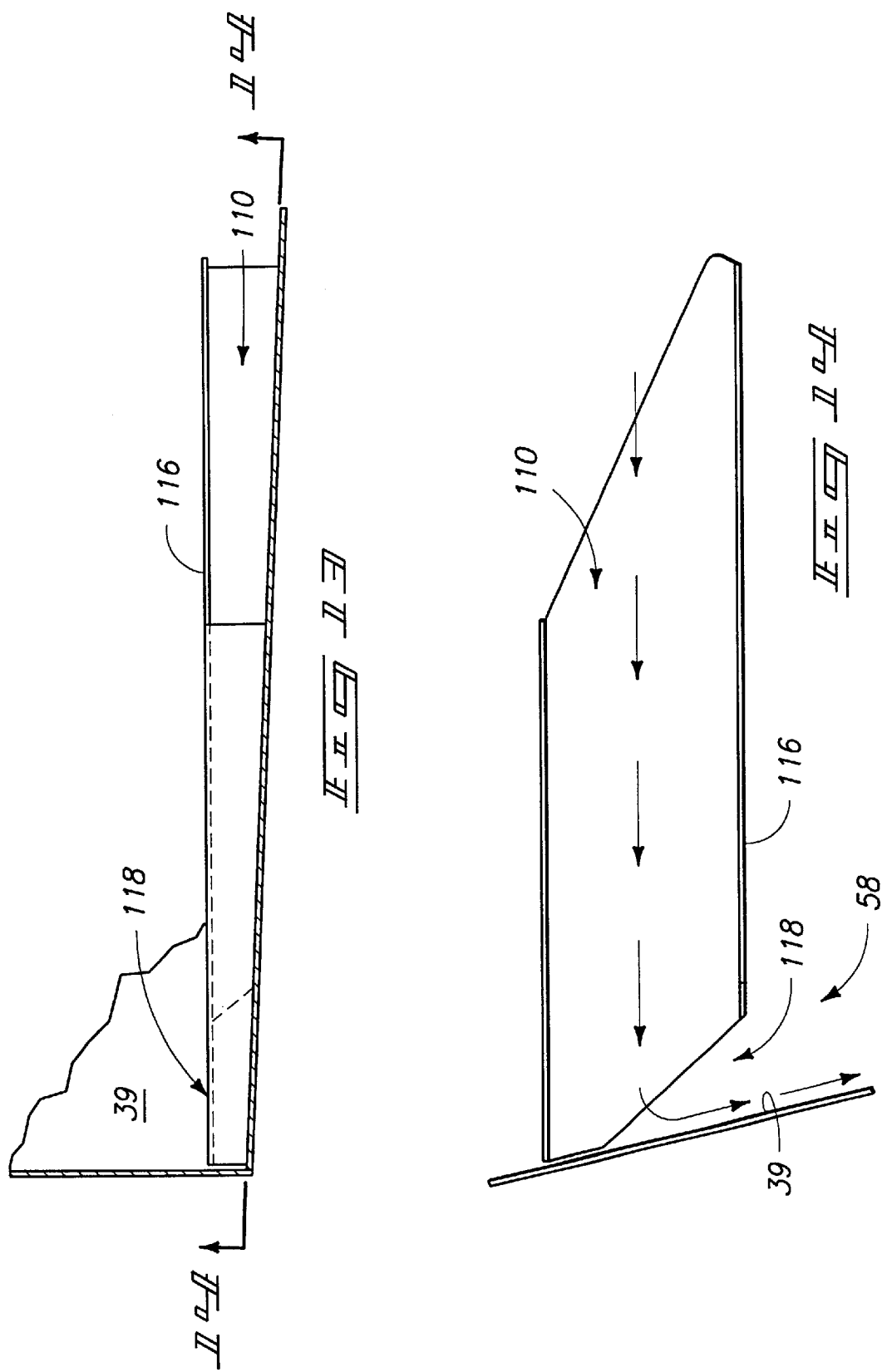

COMMINUTING APPARATUS AND PNEUMATIC RECIRCULATION SYSTEMS FOR COMMINUTING APPARATUS

TECHNICAL FIELD

The invention pertains to an apparatus for comminuting solid waste materials such as sheet material. More particularly, this invention relates to a comminuting apparatus having pneumatic conveyors and pneumatic recirculation systems for comminuting solid waste material such as foamed plastic sheet material.

BACKGROUND OF THE INVENTION

The manufacture and forming of many products from plastic produces significant amounts of plastic waste material. Applicant has previously invented several unique apparatus for comminuting severable waste material, particularly plastic sheet material, into small, rather uniform particles or pieces that can be readily recycled or disposed of in an environmentally acceptable manner. Several generations of product line have been sold by Irwin Research & Development, Inc., under the product name "Chesaw" and have gained commercial success. One such prior invention is the subject of the Irwin, et al., U.S. Pat. No. 4,687,144 granted Aug. 18, 1987. Other such prior inventions are the subject of U.S. Pat. Nos. 5,836,527; 5,860,607; and 5,893,523. However, additional improvements are needed, especially due to the use of relatively light, foamed plastic sheet material and further due to increases in operating speed that have been realized with new motors. As a consequence, there has been found to be an increased tendency for subdivided particles to accumulate within a recycle manifold so as to collect and clog such recycle manifold, which can significantly reduce operating speeds and throughput.

As an example of prior inventions, U.S. Pat. No. 5,836,527 was an improvement over the invention of U.S. Pat. No. 4,687,144. More particularly, an improved comminuting apparatus is provided which can significantly increase the amount of comminuted material produced in a given amount of time. Such device is relatively less expensive to manufacture, is quieter to operate, and provides an ability to comminute a wider variety of solid waste materials. More particularly, the solid waste comminuting apparatus carries material that is severed in the device via an airstream through a fan. Subdivided pieces of material are directed via the fan to a separator screen which is mounted within a centrifugal housing. The airstream draws a relative vacuum beneath the separator screen that carries small pieces through the separator screen into an outer volute chamber for discharge from the apparatus. Large pieces which are not capable of passing through the separator screen are recycled through a recycle outlet and a recycle conduit back to scissor rolls of the device for further size reduction. However, the complexity of the apparatus and the number of parts needed to construct the apparatus increased over the device of U.S. Pat. No. 4,687,144, which has proven undesirable for certain applications.

Another example of a prior invention is disclosed in U.S. patent application Ser. No. 09/419,822, filed Oct. 15, 1999, entitled "Downstream Pneumatic Recirculation Comminuting Apparatus", naming Jere F. Irwin as inventor. Such U.S. patent application Ser. No. 09/419,822 is incorporated herein by reference. Such patent application is directed to a downstream recirculation comminuting apparatus that uses improved pneumatic conveyor and material extraction features. More particularly, a pneumatic conveyor communicates with a shear outtake manifold to generate an air stream through a shear outtake manifold of sufficient velocity to entrain and remove subdivided pieces from the shear outtake manifold that might otherwise tend to collect and clog the shear outtake manifold. However, the utilization of such machine when subdividing certain types of material still needs further improvement. For example, the comminuting of relatively lightweight, foamed plastic sheet material tends to clog in the recycle manifold. Accordingly, such improvements are overcome by the present invention.

The present invention provides a vastly improved comminuting apparatus that is not only able to process significantly greater amounts of material in a given time, it is also better able to recirculate and sort severed solid waste material utilizing an apparatus that is less likely to clog from subdivided pieces accumulating within the recycle manifold. The improved comminuting apparatus of the present invention is formed with a relatively simple construction having a minimum number of moving parts, proves more reliable and less costly to manufacture than alternative devices, is easier to maintain and repair, and is more efficient to operate. It is also better able to sever a wider variety of different types of materials, particularly for lightweight foamed plastic materials, over a broader range of line speeds with increased levels of throughput of a web of material being received from a processing machine. Accordingly, the present invention provides an apparatus that is able to better move subdivided solid waste material through the comminuting apparatus without clogging in a relatively efficient and cost-effective manner, while also being able to handle a wide variety of severable materials at higher operating speeds and material feed rates.

The present invention provides a vastly improved comminuting apparatus that is also better able to receive sheets of solid waste material through the primary in-feed slot of an entry chute for comminuting between scissor rolls, particularly in an apparatus having a relatively simple construction with relatively few moving parts, which is relatively less costly to manufacture, maintain and repair, and is more reliable.

SUMMARY OF THE INVENTION

A self-feeding comminuting apparatus is provided having improved pneumatic entry air and overflow air recirculation systems. According to one improvement, a pair of overlapping scissor rolls cooperate to feed waste material between the pair of scissor rolls to a recycle manifold section. The recycle manifold section delivers subdivided pieces to one of the scissor rolls to recycle the subdivided pieces for sorting and/or recirculation between the pair of scissor rolls for further subdividing. The overflow air recirculation system encourages movement of subdivided material collecting within the recycle manifold into a recirculation cavity for further subdividing between the scissor rolls. According to another feature, the entry air recirculation system communicates with the entry chute to deliver a cushion of air between a sheet of material being received within the entry chute for severing between a pair of scissor rolls. Such stream of air enhances the delivery of the sheet of material into the entry chute by minimizing frictional contact therebetween so as to float the sheet of material for more stable and efficient delivery into and between a pair of scissor rolls for comminuting therebetween.

According to one aspect of the invention, a comminuting apparatus is provided which includes a frame, at least one drive motor, a set of overlapping scissor rolls and a recycle manifold. The frame has an enclosure with an entrance opening for receiving waste material. At least one drive motor is carried by the frame. The set of overlapping scissor rolls includes a first scissor roll and a second scissor roll carried within the enclosure for co-rotation and driven by the at least one drive motor, configured to draw material from beneath for delivery between the overlapping scissor rolls to subdivide the material. The recycle manifold is provided above and downstream of the scissor rolls and is configured to receive the subdivided material from between the overlapping scissor rolls. The pneumatic conveyor comprises a source of air and a pneumatic duct communicates with the recycle manifold, the pneumatic duct is configured to deliver an air stream from the source of air into the recycle manifold to entrain subdivided pieces and move the subdivided pieces from the recycle manifold for further conveying and subdividing within the comminuting apparatus.

According to another aspect of the invention, an invention is provided for a comminuting apparatus having intermeshing cutting blades carried by a frame within an enclosure and a recycling manifold provided above the blades for collecting material subdivided by the blades and an overflow fence along the recycling manifold over which subdivided material cascades for delivery back into the blades. The invention includes a pneumatic conveyor, a recirculation air pipe, and an air delivery duct. The pneumatic conveyor generates a source of air and the recirculation air pipe communicates with the pneumatic conveyor at a first end; and an air delivery duct communicates with the pneumatic conveyor via the recirculation air pipe at a second end for delivering a source of air into the recycle manifold to impinge upon subdivided material that collects within the recycle manifold behind and above the overflow fence so as to move the recycled material over the overflow fence for further comminuting.

According to yet another aspect of the invention, an air recirculation system is provided for a comminuting apparatus having a recycle manifold with an overflow fence where subdivided pieces of material cascade from the recycling manifold over the overflow fence for further comminuting via intermeshing cutting blades. The invention includes a source of air, an overflow air recirculation pipe, and a recycling air delivery duct. The overflow air recirculation pipe communicates with the source of air. The recycling air delivery duct communicates with the pneumatic conveyor via the overflow air recirculation pipe and is configured to impinge the source of air upon subdivided material collecting in and above the recycle manifold to encourage moving the subdivided material over the overflow fence for further comminuting between the intermeshing cutting blades.

According to even another aspect of the invention, a comminuting apparatus which includes a frame, an enclosure carried by the frame, at least two intermeshing scissor rolls, and a pneumatic conveyor. The enclosure carried by the frame has a material receiving duct for receiving a sheet of material. The at least two intermeshing scissor rolls are carried within the enclosure and are configured to subdivide the sheet of material. The pneumatic conveyor for a sheet of material entering the enclosure via the material receiving duct includes a source of air and an entrance air duct provided adjacent the entrance and within the enclosure, and is configured to deliver a stream of air between the sheet of material and an inner wall of the enclosure within the material receiving duct.

BRIEF DESCRIPTION OF THE DRAWINGS

Preferred embodiments of the invention are described below with reference to the following accompanying drawings.

FIG. 12 is a cross-sectional view taken along line 12—12 in FIG. 5 but with the screen removed.

FIG. 13 is a partial breakaway view taken along line 13—13 of FIG. 7 further illustrating construction of the side duct, entry plenum, and exit slot for the entry air recirculation system within the material receiving duct of FIGS. 7 and 8.

FIG. 14 is an enlarged, partial breakaway view taken along line 14—14 of FIG. 13 further illustrating construction of the side duct.

DETAILED DESCRIPTION OF THE PREFERRED EMBODIMENTS

Figure 1:
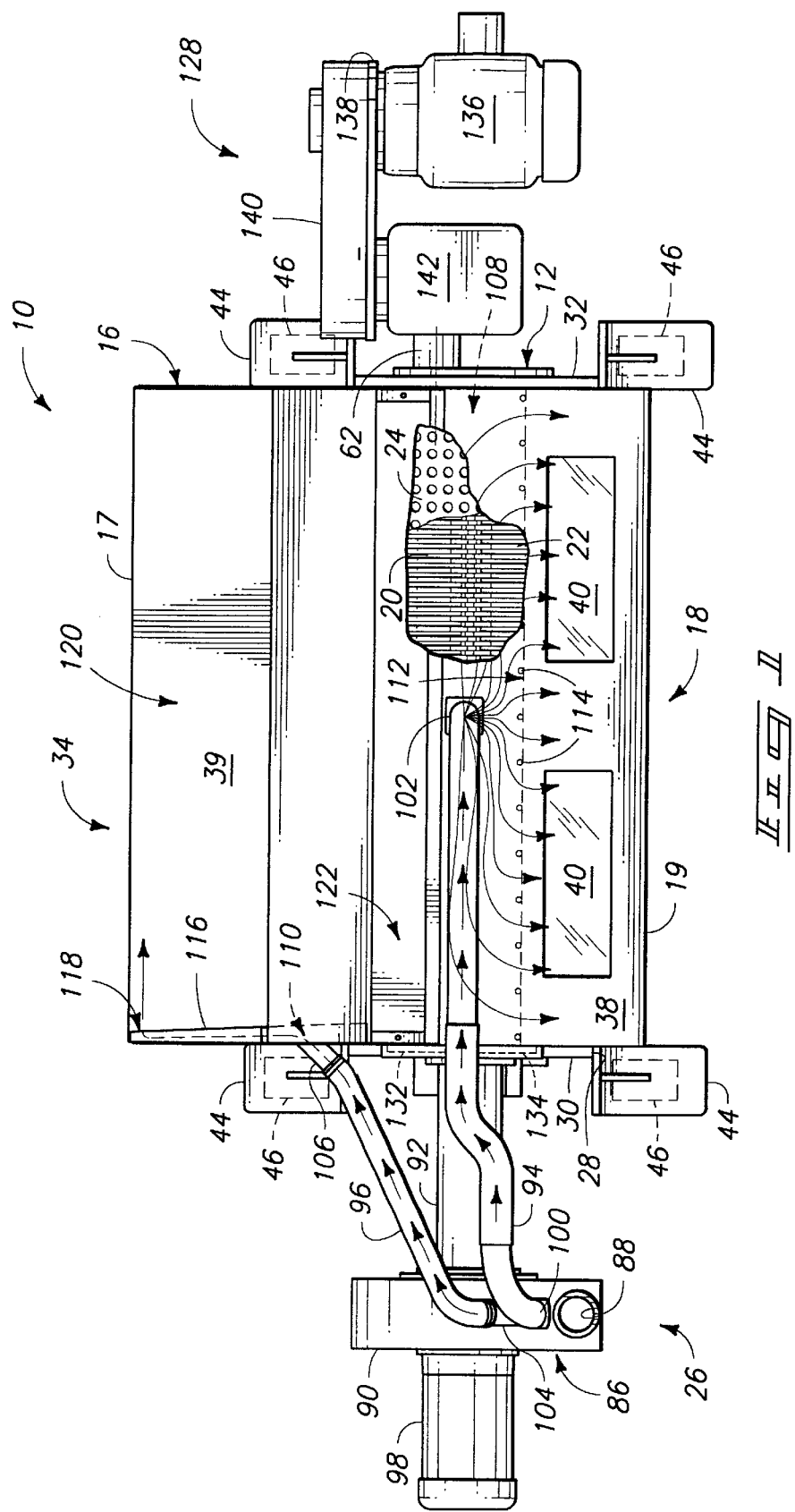
FIG. 1 is a plan view of one embodiment of the present invention illustrating a top exterior of the apparatus with a top portion broken away to show scissor rolls and a sorting screen, and further depicting entrance and recycle pneumatic circulation system features.

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising a waste comminuting apparatus shown in one exemplary size and configuration. While the invention is described by way of this one embodiment, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

According to one preferred embodiment of the invention, a waste comminuting apparatus is generally designated with reference numeral 10 in FIGS. 1–8 and 10–14. Comminuting apparatus 10 is configured for receiving solid waste material 160, for reducing the solid waste material 160 progressively into smaller and smaller sizes, or pieces, 162(a)–(e) (see FIG. 9) until the desired small particulate or piece size (162(e)) is obtained, and for withdrawing the material from the apparatus as illustrated in FIG. 9.

Applicant's invention utilizes a source of air in the form of a pneumatic conveyor 26 which generates a source of air flow and delivers air flow into a material receiving duct 16 of an enclosure 14 of comminuting apparatus 10, as well as into a recycle housing 18 within enclosure 14. More particularly, pneumatic conveyor 26 delivers a first air flow into an entry chute 17 to provide an entry air recirculation system 58. Additionally, pneumatic conveyor 26 delivers a second air flow into an air assist overflow chute 19 to provide an overflow air recirculation system 60.

Recent attempts to design an apparatus that efficiently and quickly comminutes relatively light foamed plastic materials, such as when forming foamed plastic carry-out containers used in the restaurant industry, have been somewhat unsuccessful. Such relatively light foamed plastic materials tend to collect within a comminuting apparatus, thereby restricting operating speeds and requiring an increase in container size for the comminuting apparatus. As a consequence of such relatively light materials tending to collect within a comminuting apparatus, a recycle housing on prior art comminuting apparatus tends to be larger than recycle housing 18 of comminuting apparatus 10. Furthermore, the entrance feeding of foamed plastic sheet material into a prior art comminuting apparatus is not as smooth as that on comminuting apparatus 10. Accordingly, the provision of entry air recirculation system 58 enhances the entrance or input feed ability of comminuting apparatus 10 over that found in the prior art.

For the case where comminuting apparatus 10 is running at relatively high operating speeds while comminuting foamed plastic material, apparatus 10 is able to generate subdivided foamed plastic material at an increased rate. In such case, if overflow air recirculation system 60 is not provided, then the subdivided material tends to collect within the material recycle manifold. Material within the material recycle manifold tends to collect where it piles up, similar to sand piling up in the form of a sand dune. In order to enhance the comminuting of foamed plastic materials, as well as other materials that tend to accumulate, and in order to comminute at higher operating rates with materials having relatively light densities, improvements have been identified and addressed via Applicant's invention as described below. Additionally, such improvements have been realized without significantly adding additional moving parts, size and cost to the construction of apparatus 10.

It should be noted that apparatus 10 is relatively compact, even though the material is progressively reduced in size in several stages to a desired predetermined small size. The predetermined small piece size will generally depend upon the desires of a particular customer, the end use, and the particular material being comminuted. Solid waste material 160, illustrated in FIG. 9, is progressively reduced to subdivided pieces 162a through 162e. When the subdivided pieces are generally reduced to the desired small size, 162e, they are removed from the apparatus as the final product. Those subdivided pieces that have not been sufficiently reduced to a desired small size are reprocessed, or recycled, until they are sufficiently reduced to the desired size.

Apparatus 10 has a general frame 12 that may be self-supported or affixed to other apparatus, such as the discharge of a thermoforming machine, for receiving solid waste material 160 directly from such a thermoforming machine, reducing the material for re-use, and withdrawing the material from the apparatus for collection and storage.

Frame 12 generally includes enclosure 14 that includes a front wall 28, side walls 30 and 32, a back wall 34, a pair of top walls 36 and 37 provided adjacent to one another at different elevations, and a bottom wall assembly 38.

Top wall 36 supports material receiving duct 16 which further includes a material in-feed slot 120 as well as an auxiliary material in-feed slot 122. Under normal operations, a sheet of solid waste material (see FIG. 5) is fed into apparatus 10. In addition or optionally, auxiliary scrap pieces of material are delivered into auxiliary material in-feed slot 122.

Frame 12 is supported on legs 44 that each has a wheel 46, one at each corner of apparatus 10. Frame 12 preferably includes walls 20, 30, 32, 34, 36, 37 and 38 and cross-members 48, 50, 52, 54, and 56 that are variously illustrated in FIGS. 1–6.

Within enclosure 14, a pair of scissor rolls 20 and 22 are mounted in an intermeshing relationship for rotation in opposite directions, or co-rotation, in coordination with each other to receive the solid waste material 160 after being delivered therebetween via scissor roll 20. Scissor roll 20 provides a feed roll, delivering sheet material 160 between scissor rolls 20 and 22, in order to shear the solid sheet material as the material passes between scissor rolls 20 and 22 (see FIGS. 5 and 6). Scissor rolls 20 and 22 are each supported at each end by a bearing similar to bearing 188 of FIG. 12.

Figure 2:
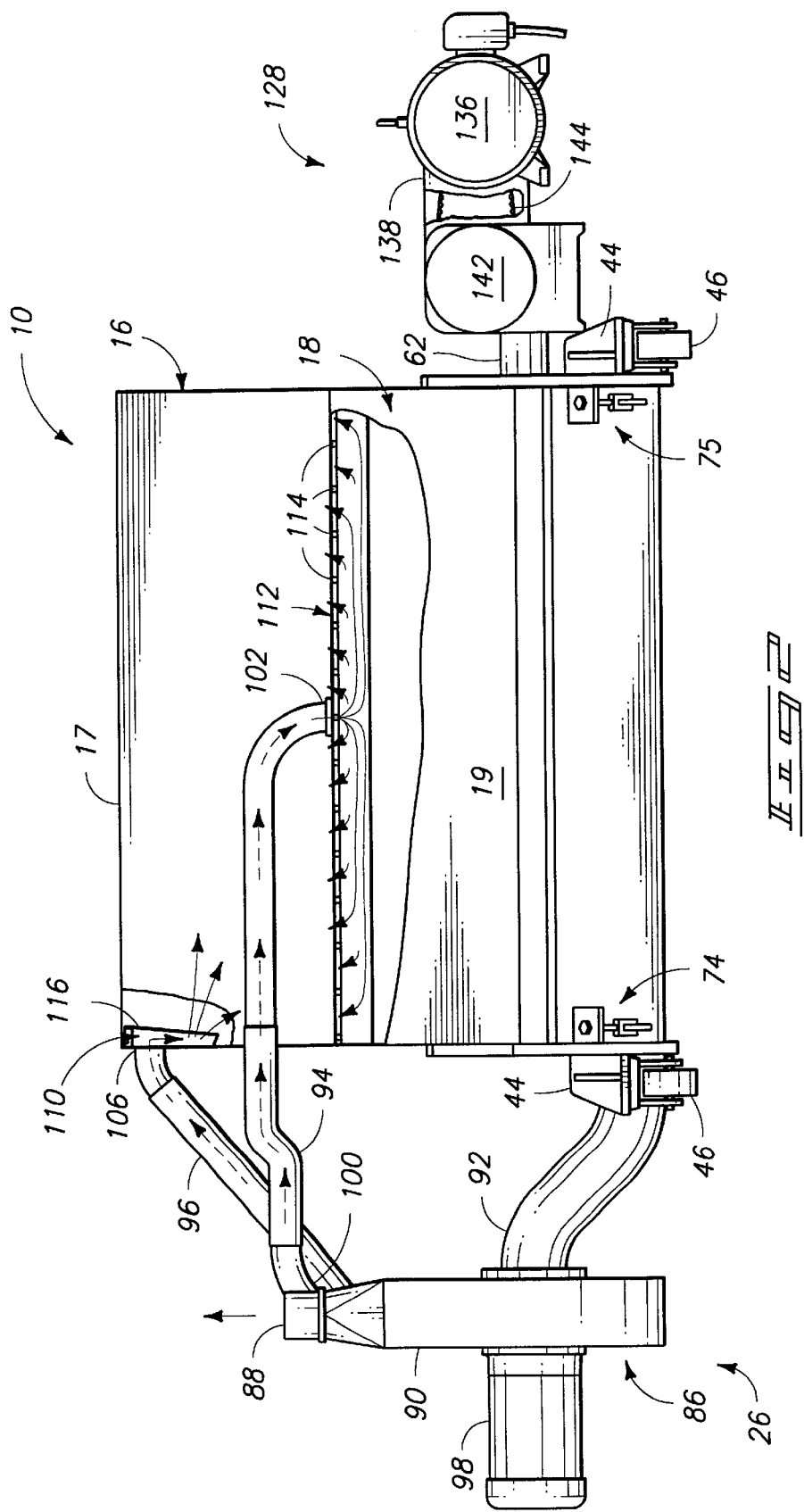
FIG. 2 is a front view of the apparatus illustrated in FIG. 1.
Figure 3:
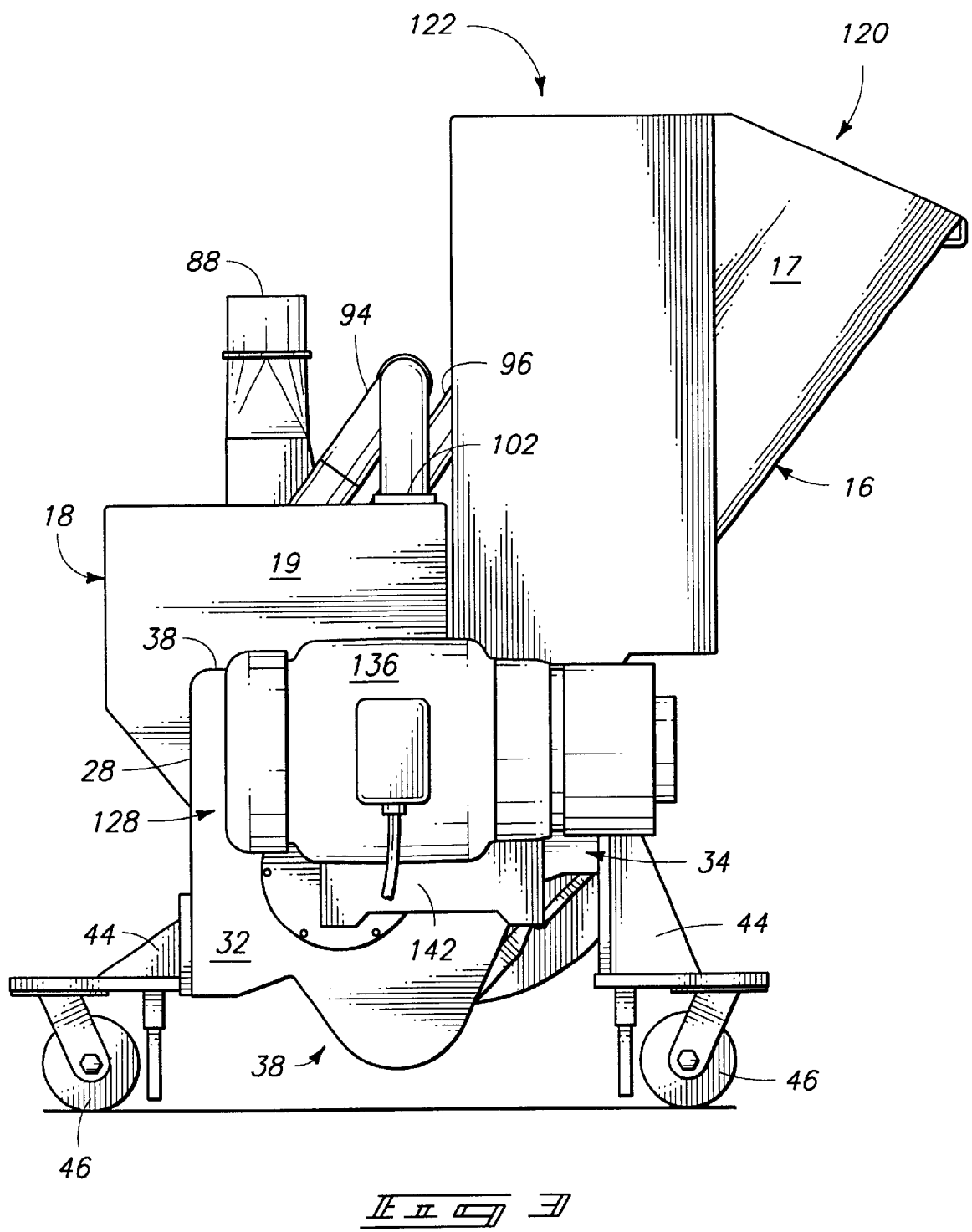
FIG. 3 is a right side view of the apparatus illustrated in FIGS. 1 and 2.
Figure 4:
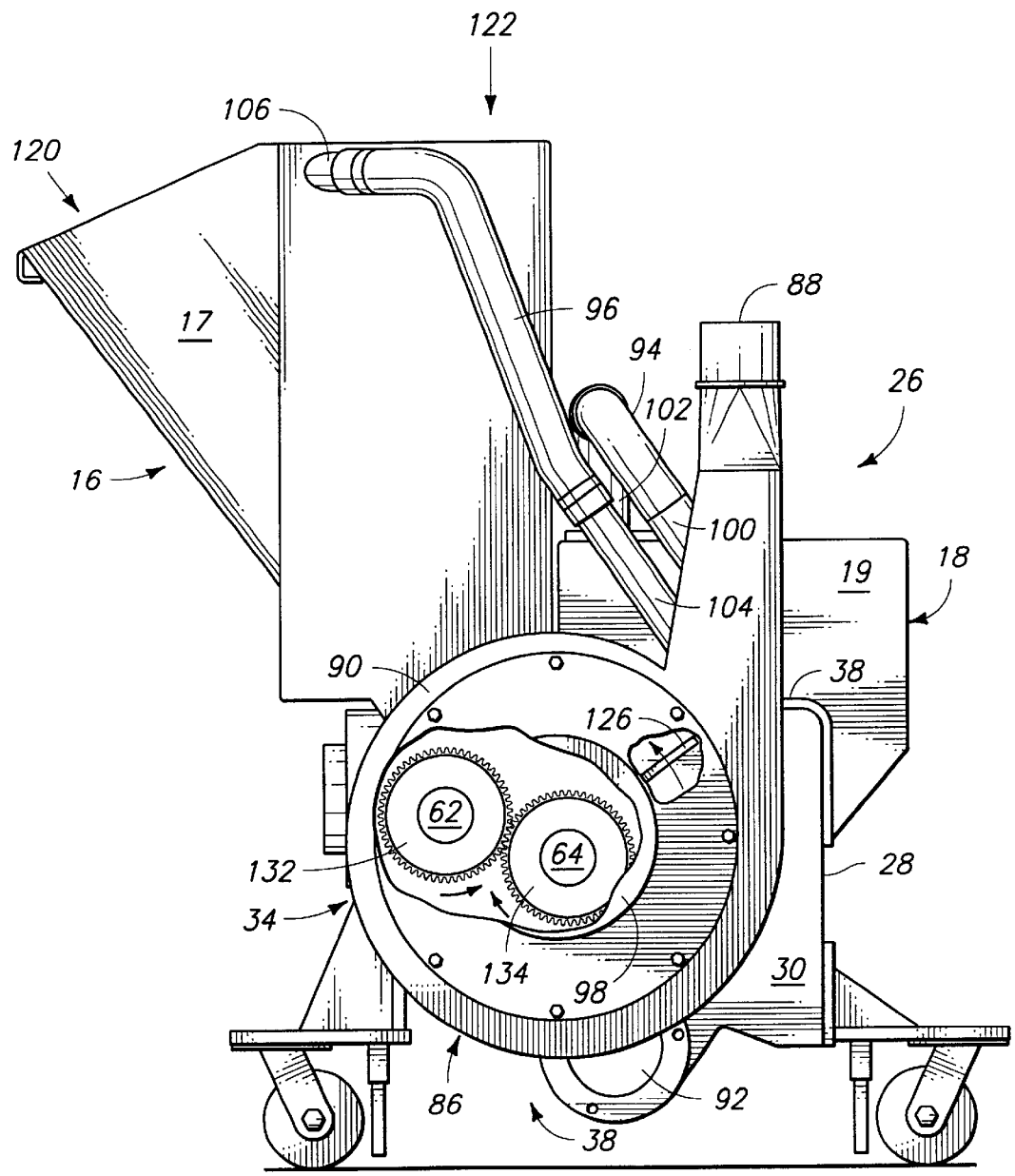
FIG. 4 is a left side view of the apparatus illustrated in FIGS. 1–3.

Apparatus 10 includes a scissor roll drive motor assembly generally designated with reference numeral 128 and illustrated in FIGS. 1–3. Scissor roll drive motor assembly 128 comprises a drive motor assembly having a motor 136 connected to a speed reduction gearbox 142. Gearbox 142 is operatively connected to a shaft 62 for rotating, or driving, shafts 62 and 64 counter to each other in the directions illustrated in FIGS. 4–6. Shafts 62 and 64 are geared together for co-rotation as shown in FIGS. 1 and 4. More particularly, scissor roll 20 includes shaft 62 upon which gear 132 is rigidly affixed at one end as shown variously in FIGS. 1–2 and 5–6. Similarly, scissor roll 22 includes shaft 64 upon which gear 134 is rigidly affixed at a corresponding end. Scissor roll 20 is driven for opposite rotation than scissor roll 22 by way of intermeshing gears 132 and 134 (see FIG. 4). Gears 132 and 134 are provided at an opposite end from scissor roll drive motor assembly 128 (see FIG. 1). In this manner, drive motor assembly 128 drives shaft 62 for rotation, with shaft 64 being driven in co-rotation (opposite rotation, but journaled together), which causes scissor rolls 20 and 22 to comminute material presented therebetween.

Figure 5:
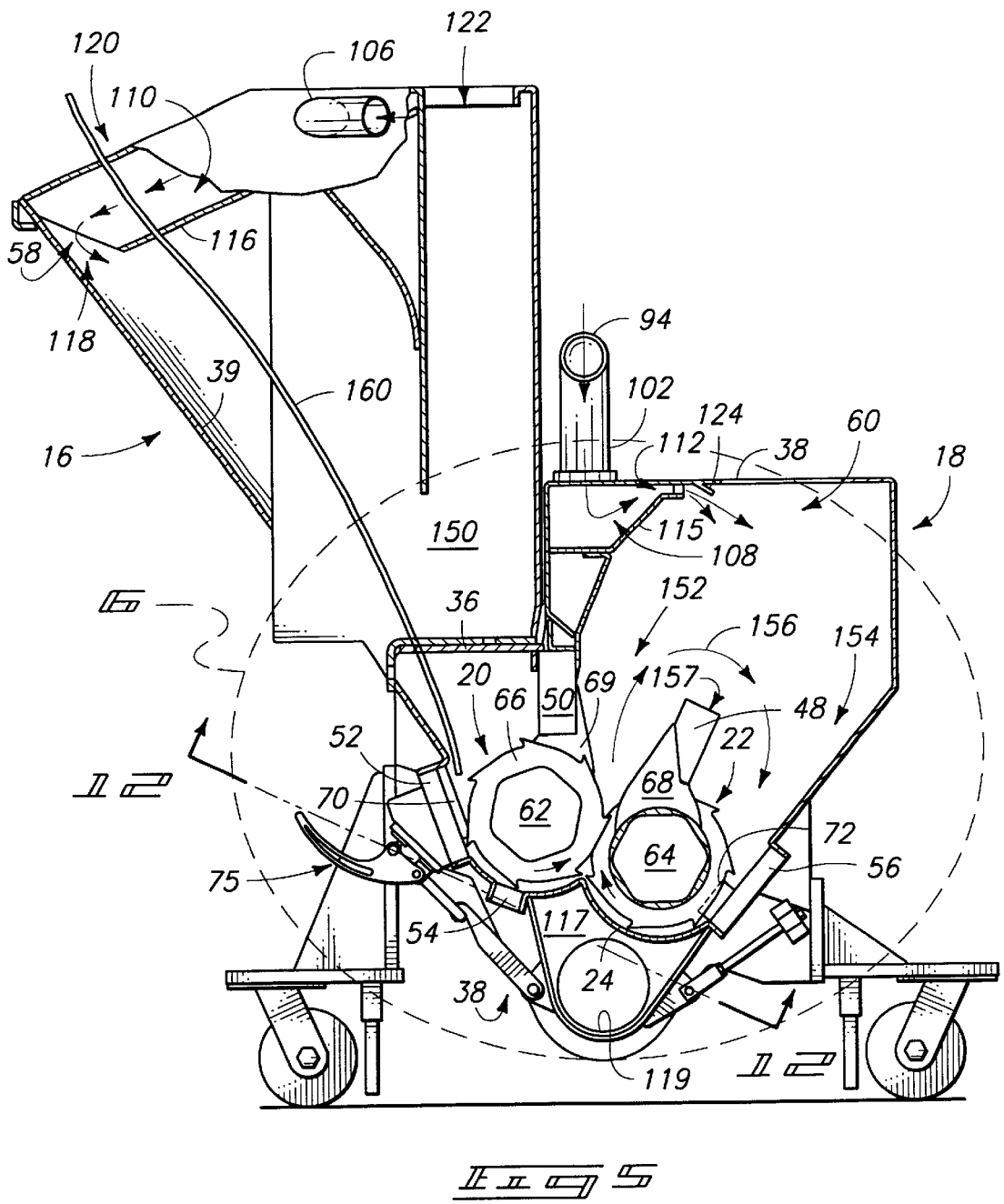
FIG. 5 is an enlarged transverse vertical cross-sectional view taken along line 5—5 of FIG. 1 illustrating the interior of the apparatus.
Figure 6:
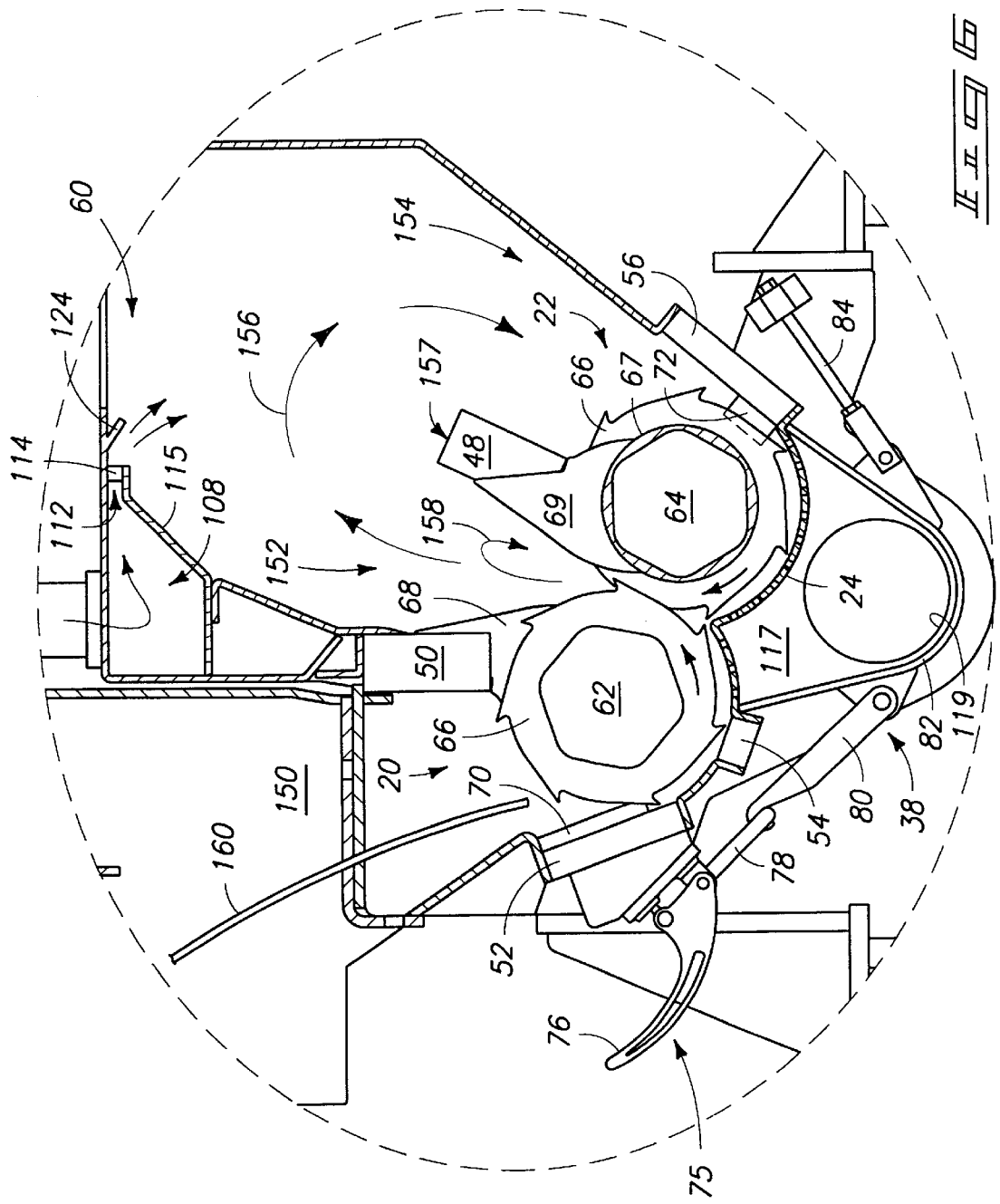
FIG. 6 is a further enlarged transverse vertical cross-sectional and partial view taken within the encircled region of FIG. 5 and further illustrating the interior of the apparatus.
Figure 7:
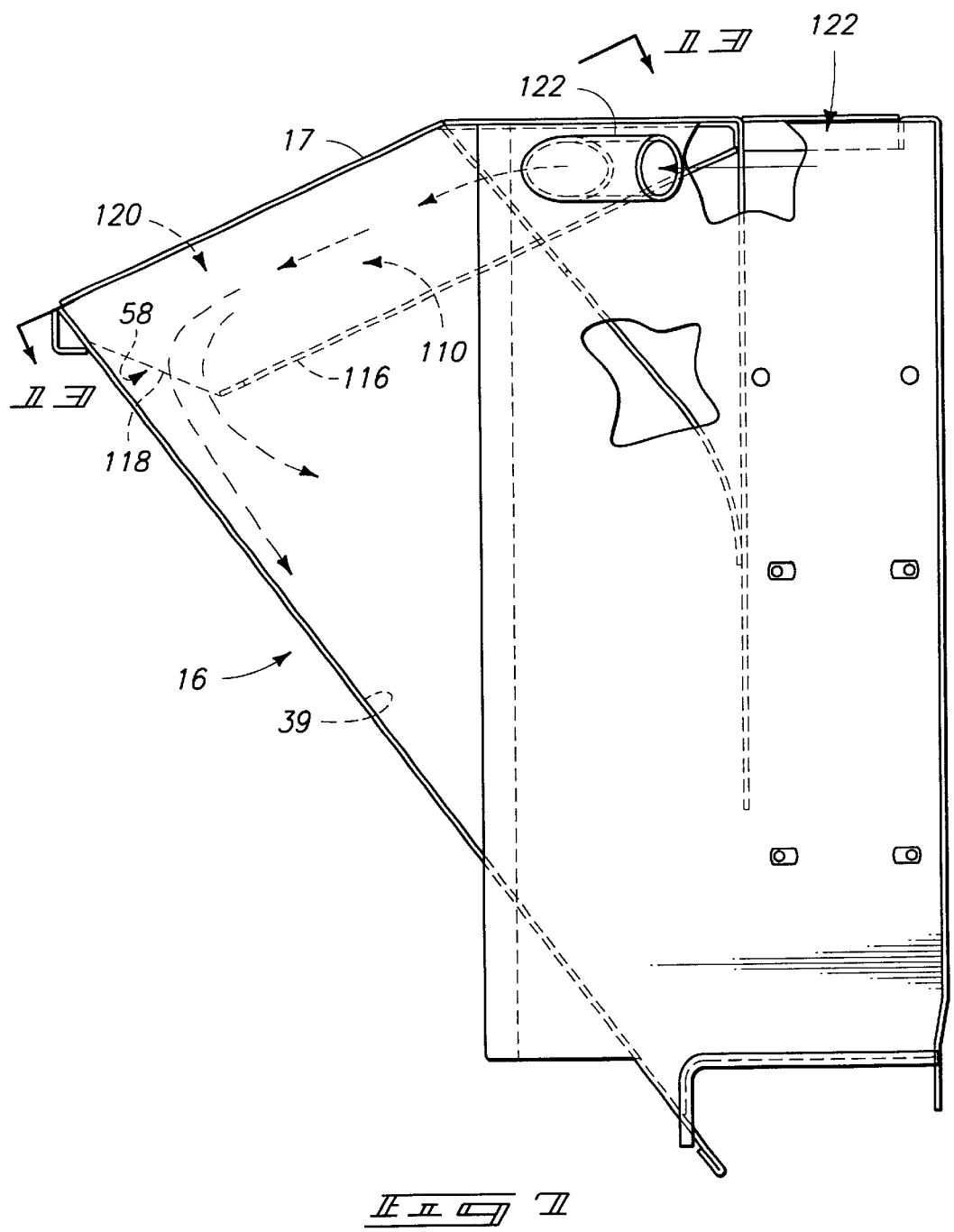
FIG. 7 is an enlarged left side view solely of the material receiving duct of the apparatus corresponding with the view taken in FIG. 5.

As shown in FIGS. 5 and 6, scissor rolls 20 and 22 are positioned within enclosure 14 between intake manifold 150 and recycle manifold 152. Recycle manifold 152 communicates with a recirculation cavity within recycle housing 18. Intake manifold 150 receives sheet material through in-feed slot, or entrance, 120, as well as through recycle manifold 152. Material 160 is subdivided as it passes between scissor rolls 20 and 22. Such material, after passing through scissor rolls 20 and 22 from beneath, ascends into recycle manifold 152 (see FIG. 5) which communicates with recirculation cavity 154 via a recycle flow path 156.

Scissor roll 20 is mounted on shaft 62 which rotates about a first axis (see FIG. 6). Scissor roll 22 is mounted on shaft 64 which rotates about a second axis, parallel to the first axis. According to one construction, both axes are substantially parallel with each other, both extending horizontally, and extending between side walls 30 and 32 (see FIG. 1). However, scissor roll 20 is elevated relative to scissor roll 22 such that the respective axes lie in a common plane that is inclined relative to a horizontal plane.

According to one construction, the resulting inclined plane lies at an angle θ from about 15 degrees to about 45 degrees. Such axes are positioned so that scissor rolls 20 and 22 have sufficient overlap to shear material between the scissor rolls as the material passes between the scissor rolls. However, the particular construction and arrangement of scissor rolls 20 and 22 within apparatus 10 is not critical to the implementation of Applicant's invention. Similarly, the provision of a separating screen 24 therebeneath is not necessary in order to implement the beneficial features of Applicant's invention.

As shown in FIGS. 1–3, gearbox 142 of scissor roll drive motor assembly 128 comprises a right-angle, double-enveloping worm gearbox. One suitable worm gearbox is a Model No. FSHV40-Z0A-10:1, sold by the Cone Drive Division of Textron, of Traverse City, Mich. However, other gearboxes can be utilized. Furthermore, such gearbox can be eliminated if an alternative drive connection is provided between motor 136 and shaft 62.

As shown in FIGS. 1–3, drive motor 136 of scissor roll drive motor assembly 128 comprises a three-phase AC motor, such as a 15-bhp AC motor. One exemplary 15-bhp AC motor comprises a synchronous three-phase 15-bhp Baldor motor, Model CM2333T, manufactured by Baldor Electric Company of Fort Smith, Ark. 72902-2400. According to optional constructions, a variable speed AC drive motor, or servo motor, can be provided with a flux vector AC drive. Accordingly, an alternative construction utilizes a servo drive motor. It is understood that further optional motor constructions can be utilized in order to drive scissor rings of scissor rolls within a comminuting device. Further alternatively, more than one motor can be utilized such that each scissor roll is driven by a dedicated motor. Even furthermore, more than two scissor rolls can be utilized within the comminuting apparatus. Even furthermore, any alternative construction having intermeshing cutting blades can benefit from utilization of the inventive features disclosed herein.

As shown variously in FIGS. 1–3, motor 136 is carried by a bracket, or plate, 138 via gearbox 142. Gearbox 142 is further secured to frame 12 by additional framework (not shown) such as by the use of struts that are tied to side wall 32 in frame 12. Furthermore, a timing belt 144 couples motor 136 to drive gearbox 142 and shaft 62. Belt 144 is carried about a pair of toothed pulleys (not shown), one attached to motor 136 and another attached to gearbox 142. Such pulleys engage with a timing belt. Alternatively, a chain can be substituted for belt 144 wherein sprockets are substituted for the pulleys. A cover 140 (see FIG. 1) affixes to bracket 138 to encase belt 144 (see FIG. 2) and the associated pulleys.

As shown in FIGS. 5 and 6, shafts 62 and 64 are supported for rotation at each end by respective bearings 188 (see FIG. 12). Each of shafts 62 and 64 has a hexagonal cross-sectional profile, thereby providing six angular drive surfaces 164 (see FIGS. 10 and 11).

Figure 10:
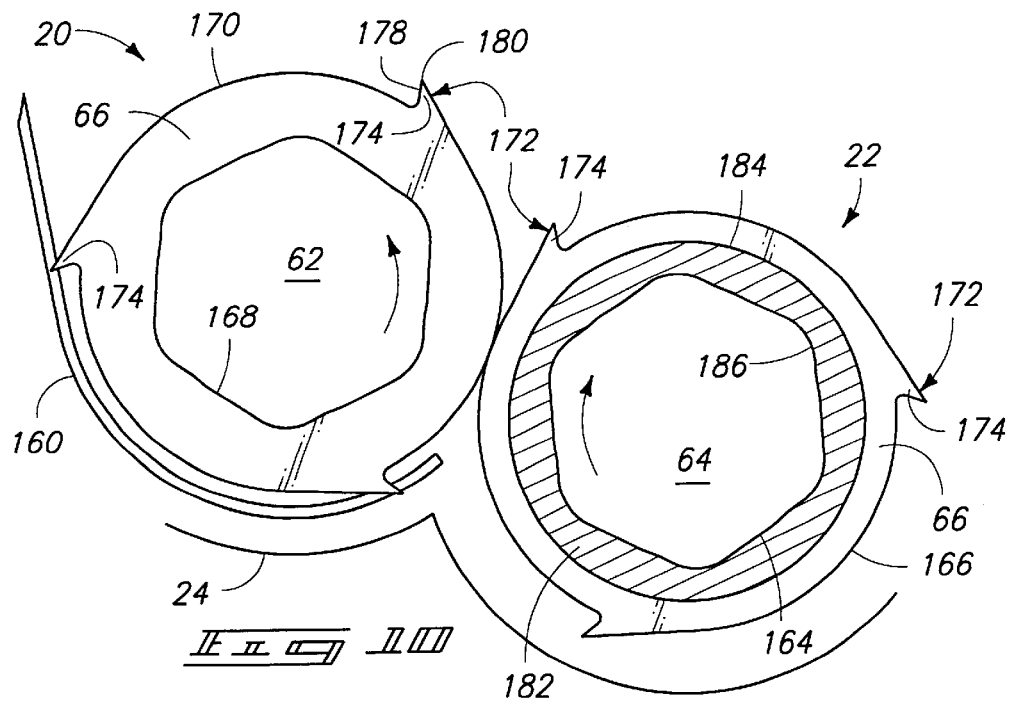
FIG. 10 is an isolated vertical cross-sectional view taken along line 10—10 in FIG. 12, but rotated to show the cross-section in correct vertical view, of a set of scissor roll rings and screen illustrating the initial entrance and feeding of a piece of waste material between the scissor rolls.
Figure 11:
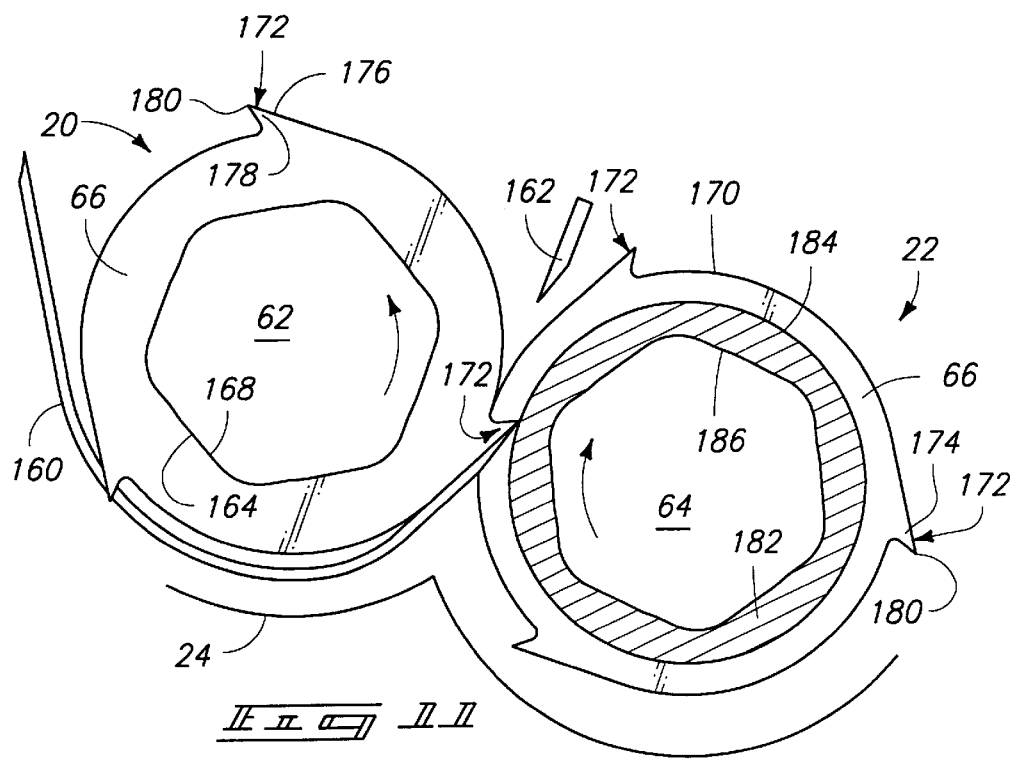
FIG. 11 is an isolated vertical cross-sectional view similar to FIG. 10 taken along line 11—11 in FIG. 12, but rotated to show the cross-section in correct vertical view, except showing the scissor roll rings incrementally rotated to feed and sever the piece of waste material.

Each of scissor rolls 20 and 22 includes a plurality of scissor rings 66 in which each of rings 66 has an outer circumferential peripheral surface 166 and an inner hexagonal bearing surface 168 that is complementary to the profile of shafts 62 and 64 so that the scissor rings 66 rotate in response to the rotation of shafts 62 and 64 (see FIGS. 10 and 11). Each of scissor rings 66 includes side surfaces that form shearing edges 170 with the outer peripheral surface 166 (see FIGS. 10 and 11).

According to a preferred embodiment, each of scissor rings 66 has evenly angularly spaced finger knives 172 formed integrally on scissor rings 66 and projecting radially outward of surface 166 and forward in the direction of rotation for gripping, puncturing, and transversely cutting solid material 160, as illustrated in FIGS. 10 and 11. Each of finger knives 172 includes a projecting body 174 that projects radially outward from the peripheral surface 166 and projects forward in the direction of rotation. Each of finger knives 172 includes a side shearing surface 176 in an undercut surface 178, forming a sharp knife point 180. The scissor ring finger knives 172 are intended to grip, puncture and traverse the cuttage piece as it is being sheared between scissor rings 66.

Each of scissor rolls 20 and 22 further includes a plurality of ring spacers 182. Each ring spacer 182 has a circular outer peripheral surface 184 and an inner hexagonal surface 186 (see FIGS. 10 and 11). Circular outer peripheral surface 184 of each ring spacer 182 has a groove sized to receive the corresponding stripper fingers 68 and 69 of one of the frame cross-members 50 and 48, respectively (see FIGS. 5–6). The corresponding circumferential groove is not indicated with a reference numeral due to its relatively thin profile in order to facilitate simplification of the drawings. A corresponding groove is sized such that stripper fingers 68 and 69 are smoothly and cleanly received therein, preventing fingers 68 and 69 from scraping the sides of each adjacent scissor ring 66. Accordingly, each of ring spacers 182 has a width that is slightly greater than the width of scissor rings 66. Each of the scissor rings 66 and ring spacers 182 are alternately positioned on shafts 62 and 64 so that a scissor ring 66 on one scissor roll opposes a corresponding ring spacer 182 on the other scissor roll, creating a circular inter-roll cavity 190 (see FIG. 12) that passes between scissor rolls 20 and 22 into the recycling manifold 152.

According to one construction, the rotational axes of scissor rolls 20 and 22 are sufficiently spaced so that there is a slight overlap of approximately one-eighth inch (⅛") in the profile of the scissor rings so that as they are rotated, the material is sheared by the shearing edges 170 and the knife fingers 172 as a profile of scissor rings 66 moves into a circular inter-roll cavity 190 of the opposing ring spacer 182 (see FIG. 12). As shown in FIG. 5, once material 160 is cut and sheared by scissor rolls 20 and 22, it is carried into recycle manifold 152, which communicates with, and is formed in part by, recycle flow path 156 and recirculation cavity 154. Once cut and sheared material 160 collects in manifold 152 to a sufficient height, it cascades over the top portion of frame cross-member 48, falling into recirculation cavity 154, where it is recycled via scissor roll 22. Such cascading is further encouraged by pneumatic action of overflow recirculation system 60 (see FIG. 5).

In order to encourage the cascading of subdivided pieces of material 160 so they fall into recirculation cavity 154, overflow plenum 108 delivers a flow of relatively high-velocity air within recycle housing 18 in a manner that encourages cascading of cut and sheared material 160 from recycle manifold 152 and over cross-member 48. Accordingly, cross-member 48 provides an overflow fence 157 over which subdivided material cascades in response to air flow generated by overflow plenum 108. Accordingly, overflow plenum 108 reduces the vertical collection of subdivided material within and above recycle manifold 152, particularly when subdividing relatively light materials, such as foamed plastic materials. Hence, the size of recycle housing 18 can be significantly reduced because any tendency for subdivided material to collect above recycle manifold 152 is substantially reduced or eliminated. Furthermore, processing speeds can be increased because the rate of circulation of subdivided material into recirculation cavity 154 is substantially increased.

Upon receiving subdivided material into recirculation cavity 154, scissor roll 22 drives the material 160 between roll 22 and screen 24, and upward between scissor rolls 20 and 22 for further comminuting. Concurrently or optionally, material of sufficiently small size passes through screen 24 into shear outtake manifold 117 via a shear outtake manifold outlet 119 by way of outtake pipe 92 and pneumatic conveyor 26 (see FIGS. 2 and 5).

Further details of one such suitable construction for a source of air in the form of a pneumatic conveyor 26 having a centrifugal fan 86, an outtake pipe 92, a shear outtake manifold 117, and a shear outtake manifold outlet 119 are provided in Applicant's co-pending U.S. patent application Ser. No. 09/419,822, filed Oct. 15, 1999, entitled "Downstream Pneumatic Recirculation Comminuting Apparatus", naming Jere F. Irwin as inventor. Such U.S. patent application Ser. No. 09/419,822 has been previously incorporated herein by reference.

By passing subdivided material upward between scissor rolls 20 and 22, cut and sheared material is again fed via scissor roll 22, which serves as a feed roll, back into scissor rolls 20 and 22 by passing the material between scissor roll 22 and screen 24 where individual teeth on scissor rings 66 convey and deliver sheet of material 160, along with recirculated cut and sheared material back to roll 22 for further delivery, sorting and/or severing.

Material 160, which has passed over recycle flow path 156 and has been directed to scissor roll 22, is thus recirculated via projecting bodies 174 (see FIGS. 5 and 12) of scissor rings 66 back to scissor roll 22, where it is reprocessed between rolls 20 and 22 for delivery back into recycling manifold 152.

Particles 162(e) of sufficiently small size are separated out via a perforated plate, or separator screen, 24 which is provided immediately below and adjacent to rolls 20 and 22, conforming substantially to their general nested bottom edge configuration. Here, screen 24 has the shape of a bi-concave perforated plate. Apertures in screen 24 are sized such that sufficiently small particles 162(e) drop through screen 24 where they are collected via collector tray, or drop pan, 82 (see FIG. 6). Tray, or pan, 82 is releasably supported by frame 16 via a pair of handle release assemblies 74 and 75 (see FIGS. 2, 5 and 6). Details of such releasable support and handle assemblies are omitted here, but are disclosed in Applicant's co-pending U.S. patent application Ser. No. 09/335,142, filed Jun. 16, 1999, entitled "Self-Feeding Comminuting Apparatus Having Improved Drive Motor Features" and naming Jere F. Irwin as inventor. Such U.S. patent application Ser. No. 09/335,142 is incorporated herein by reference. When held in place, tray 82 also holds screen 24 in place, which facilitates quick and efficient disassembly for cleaning and maintenance. Optionally, such parts can be welded together.

Collected particles 162(e), present within tray 82, are then withdrawn through outlet 119 (see FIGS. 2 and 5–6) by way of source of air, or pneumatic conveyor, 26, which draws a vacuum, and pneumatic duct 92, which generates an air stream. Particles 162(a)–(d) (see FIG. 9) which are not sufficiently small enough to pass through screen 24 continue to be recirculated between rolls 20 and 22 via scissor roll 22.

Additionally, some of recirculated pieces 162(a)–(e) in recycle manifold 152 are sifted, or passed, in a reverse direction along flow path 158 (see FIG. 6) where they fall backwards, or in reverse, between inter-roll cavities 190 (see FIG. 12) and return to screen 24. In this manner, particles having sufficiently small size 162(e) are sifted by falling back via flow path 158 to screen 24 where they are collected in tray 82. Likewise, particles that fall back, but that are not sufficiently small in size, such as particles 162(a)–(d), are passed down through rolls 20 and 22 where they are reprocessed and delivered upwardly to be further recycled via recycle manifold 152, recirculation flow path 156, and recirculation cavity 154.

As shown in FIGS. 5 and 6, a plurality of feeding fingers 70 are provided adjacent scissor roll 20 in order to further facilitate the piercing and driving of any material passing between roll 20 and cross-member 52. Each individual feeding finger 70 comprises a metal bar sized to fit in the gap provided between adjacent scissor rings 66. Similarly, a plurality of metering fingers 72 are provided along scissor roll 22 to meter the delivery of recycled, recirculated material from recirculation cavity 154 and between scissor roll 22 and screen 24. Each metering finger 72 is configured to be received within the inner space cavity formed between adjacent scissor rings 66 (see FIG. 5).

As shown in FIG. 6, screen 24 is carried at each end by respective edge portions of tray 82 so as to be presented in inter-nested adjacent relation with scissor rolls 20 and 22. Screen 24 is quickly and easily removed for maintenance, repair and/or cleaning by releasing hand release assemblies 75 and 76 such that retaining loops 78 can be releasably removed from clasp bars 80 which facilitates the dropping of tray 82 and removal of screen 24. Screen 24 and tray 82 are re-secured by latching loops 78 onto clasp bars 80 and securing the respective hand release assemblies 75 and 76, including pivotally latching and securing the individual handles. An opposite side of tray 82 is supported by a pair of retaining rods 84 supported in oversized holes in respective support brackets. When released to a dropped position, tray 82 can be pivotally dropped for cleaning and maintenance. Additionally, screen 24 is further secured into engagement with cross-members 54 and 56.

As shown in FIG. 5, intake manifold 150 is configured to receive sheet material 160 from primary entrance 120 of material receiving duct 16. Optionally, waste material can be received in auxiliary material in-feed slot 122. New solid waste material 160 enters the sheet in-feed slot 122 for comminuting between scissor rolls 20 and 22. Recycled, subdivided material requiring additional recycling is recirculated via recycling manifold 152 where it is re-delivered over overflow fence 157 (comprising cross-member 48) for re-delivery by way of recycle flow path 156 to recirculation cavity 154. Alternatively, such material is returned via reverse sort path 158 (see FIG. 6) for sifting in screen 24, further severing, and subdividing via rolls 20 and 22.

Material receiving duct 16 also includes entry air recirculation system 58. Entry air recirculation system 58 comprises an entry outlet 106 that receives a flow of air via entry air recirculation pipe 96 from centrifugal fan 86 (see FIG. 4). Such entry outlet 106 communicates with an entry plenum 110 that terminates at an exit, or ejection, slot 118. Entry plenum 110 comprises a side duct 116 provided along one side of material receiving duct 16. Slot 118 ejects a stream of air against surface 39 at relatively high velocity due to the narrow constrictions of side duct 116 (see FIGS. 13 and 14).

As such relatively high velocity stream of air is delivered via entry plenum 110 for impingement against surface, or face, 39 of material receiving duct 16, such air streams laterally across face 39 (as seen in FIG. 5) so as to create a cushion of air atop which sheet of material 160 rides. Hence, sheet of material 160 is received within material receiving duct 16 while riding on a ribbon or stream of air. Accordingly, sheet of material 160 is supported, or floated, on a cushion of air to prevent such sheet of material 160 from contacting surface 39 which significantly enhances entry and delivery of such sheet of material 160 into engagement with scissor roll 20 for delivery and comminuting between scissor rolls 20 and 22.

As shown in FIG. 4, fan blades 126 are rotated within centrifugal fan 86 to provide a flow of air that exits via product outlet 88, along with sufficiently small sized pieces of material 162(e). An entry inlet 104 is provided on a radial inner surface of a volute duct extending to product outlet 88 for delivery of a stream of air to entry air recirculation system 58 (see FIG. 4). Similarly, an overflow inlet 100 is also provided on a radial inner portion of the volute duct extending to product outlet 88 for delivering a stream of air to overflow air recirculation system 60 (see FIG. 4).

According to one construction, a source of air is provided by pneumatic conveyor 26 (as shown in FIGS. 1 and 2). According to such construction, pneumatic conveyor 26 comprises centrifugal fan 86. Entry air recirculation pipe 96 directs an air stream for delivery via entry air recirculation system 58, whereas overflow air recirculation pipe 94 provides a source of air flow to overflow air recirculation system 60. Entry air recirculation pipe 96 communicates at an upstream end with entry inlet 104 and at a downstream end with entry outlet 106. Similarly, overflow air recirculation pipe 94 communicates at an upstream end with overflow inlet 100 and at a downstream end with overflow outlet 102.

It is understood that the centrifugal fan illustrated variously in FIGS. 1–4 includes a housing having a central propeller section, a peripheral volute section, and a first outer volute duct. The central propeller section includes a central inlet with a propeller assembly mounted within the central propeller section. The propeller assembly includes a shaft with radial blades 126 (see FIG. 4) extending radially outward for directing the air from a central inlet radially outward and tangentially into the peripheral volute section that terminates and extends to product outlet 88. Motor 98 is connected to the shaft for rotating the blades at a desired speed to obtain an air stream having a desired velocity and volume. Accordingly, centrifugal fan 86 communicates with a first outer volute duct and product outlet 88 for discharging sufficiently small particles 162(e) that have passed through separator screen 24 via outtake pipe 92.

Further details of the operation of apparatus 10 are disclosed in Applicant's co-pending U.S. patent application Ser. No. 09/419,822, filed Oct. 15, 1999, entitled "Downstream Pneumatic Recirculation Comminuting Apparatus", naming Jere F. Irwin as inventor, and previously incorporated herein by reference. Further such details will not be discussed herein as they are not germane to the invention at hand; namely, the entry air recirculation system 58 and overflow air recirculation system 60 described in detail herein.

FIGS. 7, 8 and 13–14 variously illustrate the entry air recirculation system 58 of Applicant's invention. More particularly, entry air recirculation system 58 is provided within entry chute 17 of material receiving duct 16 so as to deliver a ribbon, or cushion, of air at a relatively high ejection velocity from entry slot 118 across inner face 39 of entry chute 17. Such ribbon of air extending across face 39 allows a sheet of material being delivered in slot 120 to flow as such sheet of material is delivered down surface 39 towards a pair of scissor rolls.

Figure 8:
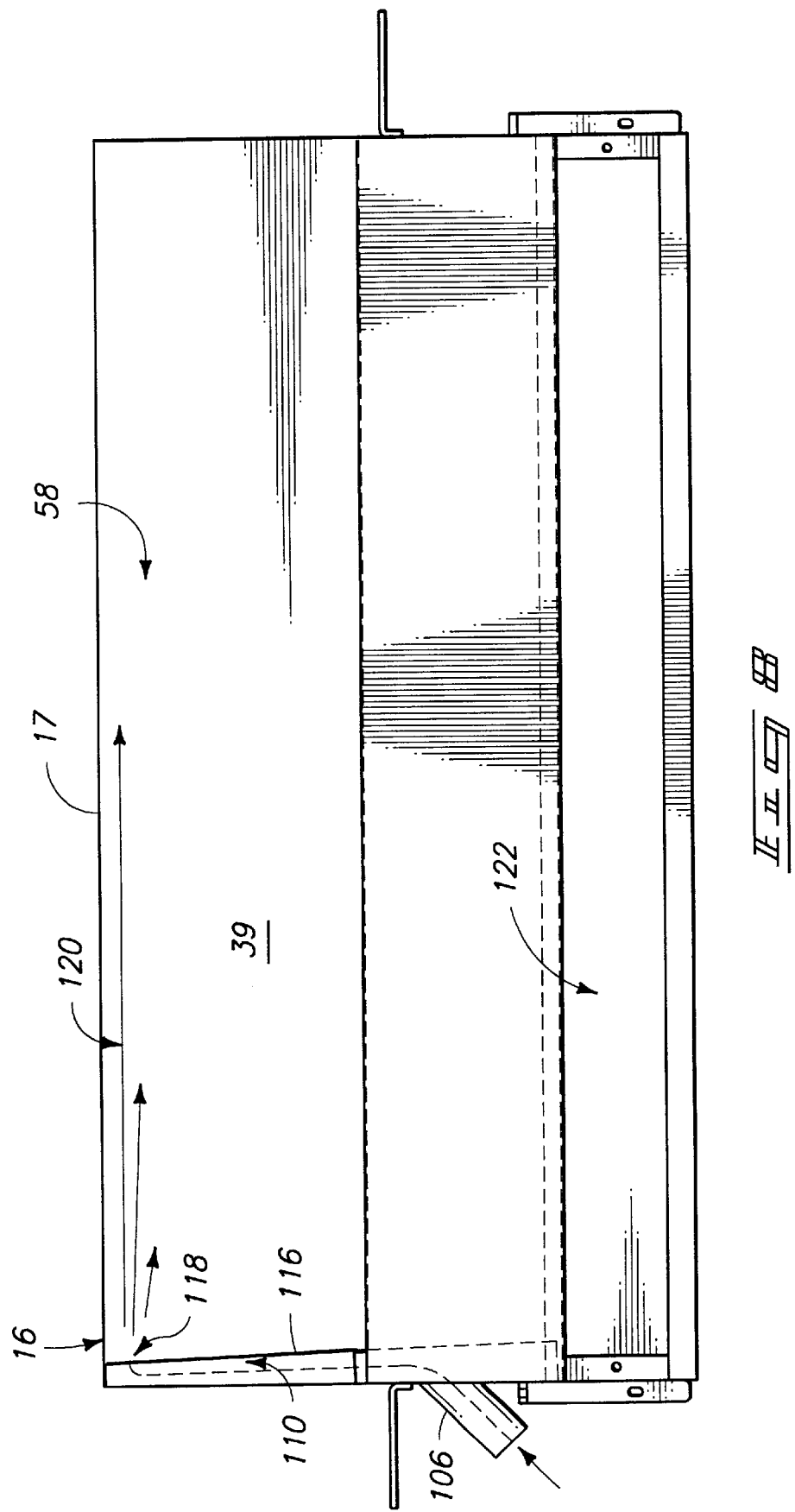
FIG. 8 is a plan view of the material receiving duct of FIG. 7 illustrating the top exterior of the material receiving duct and further illustrating the manner in which entry air is recirculated across an inner face, or surface, of a sheet in-feed slot of an entry chute via the entry air recirculation system.
Figure 9:
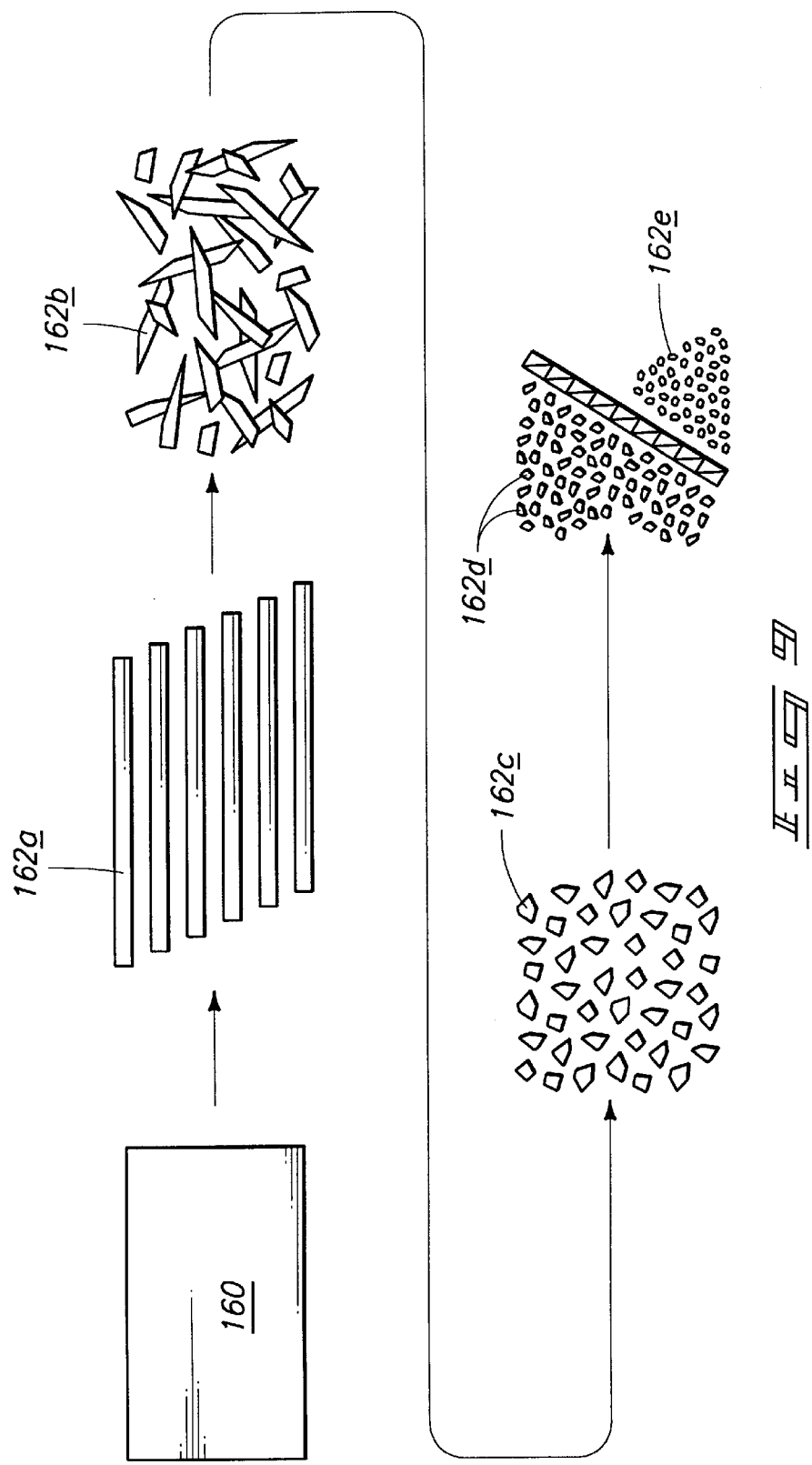
FIG. 9 is a series of illustration views of the waste material and the reduction of the waste material into smaller and smaller pieces of the material as it is progressively processed and reduced to a desired particulate size.

As shown in FIGS. 8 and 13, side duct 116 decreases in cross-sectional area extending from an upstream end towards a downstream end. Accordingly, side duct 116 provides a narrowing, or constricting, entry plenum 110 which imparts a greater velocity to air flow ejecting therefrom. Upon leaving slot 118, such air impinges against surface 39 which causes a significant portion of such air to flow outwardly across face 39, as seen in FIG. 8. Some air also extends downwardly along face 39, as shown in FIG. 14. However, it has been found that a significant stream of air extends across face 39, as shown in FIG. 8, due to impingement of such air flow from slot 118 against face 39. Such ribbon or stream of air provides a cushion atop which a sheet of material being in-fed via slot 120 floats. The floating of such sheet of material has been found to significantly enhance the ease and efficiency with which a sheet of material is delivered into the present apparatus for comminuting and severing. Hence, entry air recirculation system 58 provides a further improvement in the speed and efficiency with which material is recycled within a comminuting apparatus, particularly when processing sheets of foamed plastic material.

FIGS. 1–6 variously illustrate the overflow air recirculation system 60 of Applicant's invention. Air assist overflow chute 19 provides air flow into air assist overflow chute 19 from pneumatic conveyor 26. In one case, pneumatic conveyor 26 is provided by centrifugal fan 86. Overflow air recirculation pipe 94 provides a source of air flow to overflow air recirculation system 60. A recirculating air delivery duct is provided in the form of an overflow plenum 108 (see FIG. 5), comprising a sheet metal baffle 115, that communicates with the pneumatic conveyor via the overflow air recirculation pipe 94. Overflow plenum 108 is configured to impinge the source of air upon subdivided material collecting in and above recycle manifold 152 in order to encourage moving the subdivided material over overflow fence 157 for further comminuting between the intermeshing cutting blades. Overflow air recirculation pipe 94 terminates in an overflow outlet 102, as shown in FIG. 5.

Overflow plenum 108 comprises a plurality of overflow plenum slots 112 (see FIGS. 2 and 5–6), separated by spacers 114 (see FIGS. 2 and 6), that are configured to eject the source of air at an increased velocity in order to impinge upon the subdivided pieces of material collecting within and above the recycle manifold.

As shown in FIG. 5, a flow deflector 124 is provided downstream of the plurality of overflow plenum slots 112.

Flow deflector 124 is configured to divert the source of air leaving the overflow plenum slots so as to impinge upon the subdivided material collecting above the recycle manifold in order to cause cascading of the recycled material over the overflow fence 157 for further comminuting between the intermeshing cutting blades.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A comminuting apparatus, comprising:
    a frame having an enclosure with an entrance opening for receiving waste material;
    at least one drive motor carried by the frame;
    a set of overlapping scissor rolls including a first scissor roll and a second scissor roll carried within the enclosure for co-rotation and driven by the at least one drive motor, configured to draw material from beneath for delivery between the overlapping scissor rolls to subdivide the material;
    a recycle manifold provided above and downstream of the scissor rolls and configured to receive the subdivided material from between the overlapping scissor rolls;
    a recirculation cavity adjacent the recycle manifold, wherein the recycle manifold comprises an overflow fence extending above the scissor rolls and between the recycle manifold and the recirculation cavity, wherein a recycle flow path extends over the overflow fence from the recycle manifold to the recirculation cavity for delivering subdivided pieces of material; and
    a pneumatic conveyor comprising a source of air and a pneumatic duct communicating with the recycle manifold, the pneumatic duct configured to deliver an air stream from the source of air into the recycle manifold to entrain subdivided pieces and move the subdivided pieces from the recycle manifold for further conveying and subdividing within the comminuting apparatus;
    wherein the airstream from the pneumatic duct impinges on accumulated subdivided pieces of material collecting above the recycle manifold to pneumatically move the subdivided pieces of material along the recycle flow path to the recirculation cavity for delivery to the scissor rolls for further sorting and/or subdividing.

2. The comminuting apparatus of claim 1 wherein the overflow fence is provided by a cross-member of the frame that nests along and above one of the scissor rolls.

3. The comminuting apparatus of claim 1 wherein a first one of the scissor rolls is parallel and elevated relative to a second one of the scissor rolls.

4. The comminuting apparatus of claim 1 further comprising a sorting plate having perforations and provided beneath the scissor rolls for sorting undersized smaller pieces of material of a size less than a predetermined size to pass through to a shear outtake manifold.

5. A comminuting apparatus, comprising:
    a frame having an enclosure with an entrance opening for receiving waste material;
    at least one drive motor carried by the frame;
    a set of overlapping scissor rolls including a first scissor roll and a second scissor roll carried within the enclosure for co-rotation and driven by the at least one drive motor, configured to draw material from beneath for delivery between the overlapping scissor rolls to subdivide the material;
    a recycle manifold provided above and downstream of the scissor rolls and configured to receive the subdivided material from between the overlapping scissor rolls;
    a pneumatic conveyor comprising a source of air and a pneumatic duct communicating with the recycle manifold, the source of air comprising a centrifugal fan and an outer volute duct extending from the centrifugal fan to an overflow air recirculation pipe that communicates with the pneumatic duct via an overflow outlet, the pneumatic duct comprising a plurality of overflow plenum slots communicating between the pneumatic duct and the recycle manifold and extending across the recycle manifold above and substantially parallel with the scissor rolls and configured to deliver an air stream from the source of air into the recycle manifold to entrain subdivided pieces and move the subdivided pieces from the recycle manifold for further conveying and subdividing within the comminuting apparatus; and
    a deflector downstream of the overflow plenum slots configured to direct the source of air to impinge against subdivided pieces of material that accumulate in the recycle manifold to further convey the subdivided pieces to cascade over an overflow fence of the frame extending between the recycle manifold and a recirculation cavity.

6. In a comminuting apparatus having intermeshing cutting blades carried by a frame within an enclosure and a recycle manifold provided above the blades for collecting material subdivided by the blades and an overflow fence along the recycle manifold over which subdivided material cascades for delivery back into the blades, the invention comprising:
    a pneumatic conveyor for generating a source of air;
    a recirculation air pipe communicating with the pneumatic conveyor at a first end; and
    an air delivery duct comprising a plurality of overflow plenum slots communicating with the pneumatic conveyor via the recirculation air pipe at a second end and configured to deliver a stream of air into the recycle manifold to impinge upon subdivided material that collects within the recycle manifold behind and above the overflow fence so as to encourage movement of the recycled material over the overflow fence and into the recirculation cavity for further comminuting.

7. The comminuting apparatus of claim 6 wherein the pneumatic conveyor comprises a centrifugal fan.

8. The comminuting apparatus of claim 7 wherein the recirculation air pipe comprises an overflow inlet extending from the centrifugal fan and an overflow outlet communicating with the air delivery duct for delivering a source of air into the air delivery duct from the centrifugal fan.

9. The comminuting apparatus of claim 6 further comprising a flow deflector provided downstream of the air delivery duct and configured to direct delivery of the source of air into the recycle manifold to impinge upon the subdivided material collecting within and above the recycle manifold.

10. The comminuting apparatus of claim 6 wherein the air delivery duct is provided within a top portion of a recycle housing for the comminuting apparatus.

11. The comminuting apparatus of claim 6 wherein one of the overflow plenum slots is provided adjacent each end of the recycle manifold.

12. The comminuting apparatus of claim 11 wherein the plurality of overflow plenum slots are spaced equally apart from one end of the recycle manifold to another end of the recycle manifold.

13. In a comminuting apparatus having intermeshing cutting blades carried by a frame within an enclosure and a recycle manifold provided above the blades for collecting material subdivided by the blades and an overflow fence along the recycle manifold over which subdivided material cascades for delivery back into the blades, the invention comprising:
- a pneumatic conveyor for generating a source of air;
- a recirculation air pipe communicating with the pneumatic conveyor at a first end;
- an air delivery duct communicating with the pneumatic conveyor via the recirculation air pipe at a second end for delivering a source of air into the recycle manifold to impinge upon subdivided material that collects within the recycle manifold behind and above the overflow fence so as to move the recycled material over the overflow fence for further comminuting; and
- an entrance air duct provided adjacent an entrance slot of the comminuting apparatus configured to deliver a stream of air between a sheet of material being received within the entrance slot and an inner wall of an enclosure of the comminuting apparatus.

14. The invention of claim 13 wherein the entrance air duct comprises a plenum and at least one ejection slot for delivering a stream of air at a relatively high ejection velocity between the sheet of material and the inner wall of the enclosure.

15. An air recirculation system, comprising:
- a comminuting apparatus having a recycle housing and a recycle manifold with an overflow fence where subdivided pieces of material cascade from the recycle manifold over the overflow fence for further comminuting via intermeshing cutting blades;
- a source of air providing a pneumatic conveyor including a pneumatic fan;
- an overflow air recirculation pipe communicating with the source of air; and
- a recycling air delivery duct cooperating with the recycle housing to provide an overflow plenum including a plurality of overflow plenum slots and communicating with the source of air via the overflow air recirculation pipe and configured to eject the source of air at an increased velocity to impinge the source of air upon subdivided material collecting in and above the recycle manifold to encourage moving the subdivided material over the overflow fence for further comminuting between the intermeshing cutting blades; and
- a flow deflector provided downstream of the plurality of overflow plenum slots and configured to direct the source of air leaving the overflow plenum slots so as to impinge upon the subdivided material collecting above the recycle manifold to cause cascading of the recycled material over the overflow fence for further comminuting between the intermeshing cutting blades.

16. The air recirculation system of claim 15 wherein the overflow plenum is provided along a top, inner surface of the recycle housing.

17. The air recirculation system of claim 15 wherein the overflow plenum extends across a width of the recycle housing.

18. A comminuting apparatus, comprising:
- a frame;
- an enclosure carried by the frame having a material receiving duct for receiving a sheet of material;
- at least two intermeshing scissor rolls carried within the enclosure and configured to subdivide the sheet of material; and
- a pneumatic conveyor for a sheet of material entering the enclosure via the material receiving duct, the pneumatic conveyor including a source of air and an entrance air duct provided adjacent the entrance and within the enclosure, and configured to deliver a stream of air between the sheet of material and an inner wall of the enclosure within the material receiving duct.

19. The comminuting apparatus of claim 18 wherein the entrance air duct comprises a side duct provided along one side of the enclosure adjacent the entrance.

20. The comminuting apparatus of claim 19 wherein the side duct provides an entry plenum terminating in a slot from which the source of air is ejected at a relatively high velocity across the inner face of the material receiving duct.

21. The comminuting apparatus of claim 20 wherein the slot ejects a stream of air across the inner face of an entry chute of the material receiving duct.

22. The comminuting apparatus of claim 18 wherein the source of air comprises a centrifugal fan and an entry air recirculation pipe including an entry inlet and an entry outlet, wherein the entry outlet communicates with an entry plenum provided along one side of the enclosure.

23. The comminuting apparatus of claim 18 wherein the entrance air duct comprises a side duct having a decreasing cross-sectional dimension extending in a downstream direction, the side duct terminating at an ejection slot that impinges with a face of the material receiving duct.

* * * * *

UNITED STATES PATENT AND TRADEMARK OFFICE
CERTIFICATE OF CORRECTION

PATENT NO. : 6,644,573 B2
DATED : November 11, 2003
INVENTOR(S) : Jere F. Irwin

It is certified that error appears in the above-identified patent and that said Letters Patent is hereby corrected as shown below:

<u>Column 3,</u>
Line 51, delete "apparatus which includes", and insert -- apparatus is provided which includes --.

Signed and Sealed this

Sixth Day of April, 2004

JON W. DUDAS
*Acting Director of the United States Patent and Trademark Office*